(12) United States Patent
Ogasahara et al.

(10) Patent No.: US 6,352,351 B1
(45) Date of Patent: Mar. 5, 2002

(54) METHOD AND APPARATUS FOR INPUTTING COORDINATES

(75) Inventors: Tsutomu Ogasahara; Takahiro Ito; Kenichi Takekawa, all of Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/594,724

(22) Filed: Jun. 16, 2000

(30) Foreign Application Priority Data

Jun. 30, 1999 (JP) ............................................ 11-186559

(51) Int. Cl.[7] ................................................ F21V 7/04
(52) U.S. Cl. .......................... 362/31; 362/330; 345/175
(58) Field of Search ................... 362/31, 330; 345/173, 345/174, 175, 176, 183; 178/18.01, 18.09, 18.11, 19.05; 341/31, 22

(56) References Cited

U.S. PATENT DOCUMENTS

| | | | | |
|---|---|---|---|---|
| 4,205,304 A | * | 5/1980 | Moore | 341/5 |
| 4,703,316 A | * | 10/1987 | Sherbeck | 345/175 |
| 4,777,482 A | * | 10/1988 | Keneko | 345/175 |
| 4,782,328 A | * | 11/1988 | Denlinger | 345/175 |
| 4,812,830 A | * | 3/1989 | Diering | 345/175 |
| 4,820,050 A | * | 4/1989 | Griffin | 356/621 |
| 4,851,616 A | * | 7/1989 | Weles | 345/175 |
| 5,414,413 A | * | 5/1995 | Tamaru | 345/175 |
| 6,005,556 A | * | 12/1999 | Kodama | 345/175 |

FOREIGN PATENT DOCUMENTS

JP 9-091094 4/1997

\* cited by examiner

*Primary Examiner*—Sandra O'Shea
*Assistant Examiner*—Hargobind J. Sawhney
(74) *Attorney, Agent, or Firm*—Oblon, Spivak, McClelland, Maier & Neustadt, P.C.

(57) ABSTRACT

The coordinates inputting apparatus comprises two light sources provided on different positions on the touch panel, reflection members which recursively reflect the light, and light-receiving sections which receive the light and detect whether the light was cut at certain position on the touch panel. The light sources output the light at certain angle with the touch panel surface (that is, the light is not parallel to the touch panel). The light output from the light source is reflected by the touch panel, then recursively reflected by the reflection members, once more reflected by the touch panel and finally enters into light-receiving sections.

8 Claims, 3 Drawing Sheets

METHOD AND APPARATUS FOR INPUTTING COORDINATES

FIELD OF THE INVENTION

The present invention relates to a method and apparatus for inputting coordinates. More specifically, this invention relates to a method and apparatus for optically inputting coordinates.

BACKGROUND OF THE INVENTION

At present, an apparatus which can detect a position on the surface of a panel (e.g. a touch panel) that has been specified by touching with a finger or a pen, and inputs the detected coordinates are input into a computer or the like is known. An example of such a coordinates inputting apparatus has been disclosed, for instance, in Japanese Patent Laid-Open Publication No. HEI 9-91094. In this coordinates inputting apparatus, one light scanner is provided at two of the four corners of the touch panel. Each light scanner outputs a light flux which is parallel to a surface of the touch panel. A receiver receives the light flux.

When the user touches the touch panel with his (her) finger or pen, the light flux output from the light scanners is cut and the light flux is not received by the receiver. Coordinates of the position where the finger or the pen touches the touch panel are calculated from the position on the receiver where the light flux is not received. The calculated coordinates are then input into an external device. This type of coordinates inputting apparatus is sometimes called as an optical coordinates inputting apparatus, and it is widely used because of its is relatively simple configuration.

With the conventional optical coordinates inputting apparatus, however, a dark area where a light flux does not reach (described hereinafter as a gap between the light flux and the touch panel) is generated between the light flux and the touch panel, and sometimes coordinate values can not be detected in this area. This phenomenon occurs due to incorrect adjustment of the optical system that includes the light scanner, or because a portion of a light flux on the surface of the touch panel is cut due to a member which is provided to support the touch panel.

When a position in the vertical direction (in the depth direction) of a shielding object (finger or pen) matter against the touch panel is to be detected, the gap between the light flux and the touch panel surface may cause such problems as described below. That is, when the touch panel also has a function of displaying data on a display screen, a double click is detected as one click. Further, even though the pen (or finger) is separated from the surface of the touch panel cutting of the light flux apparently continues and a character is displayed continuously. Such problems become prominent as the gap between the light flux and the touch panel becomes wider. This causes a drop in the precision in detection of coordinates by the coordinates inputting apparatus and to detect erroneous coordinates.

The gap between the light flux and the touch panel surface can be made narrower by adjusting the optical system (for example, adjusting the height or inclination of the light source). However, a relatively longer time, skill and expertise are is required for such an adjustment. Thus, narrowing of the gap between the light flux and the touch panel surface by adjusting the optical system is relatively difficult.

SUMMARY OF THE INVENTION

It is an object of the present invention to provide a coordinates inputting apparatus which enables easy reduction of a gap between the light flux and the touch panel surface and further insures high precision in detection of the coordinates.

The coordinates inputting apparatus according to this invention comprises a plurality of light sources provided on different positions on the touch panel, reflection members which recursively reflect the light, and light-receiving sections which receive the light and detect whether the light was cut at certain position on the touch panel. The light sources output the light at certain angle with the touch panel surface (that is, the light is not parallel to the touch panel). The light output from the light source is reflected by the touch panel, then recursively reflected by the reflection members, once more reflected by the touch panel and finally enters into light-receiving sections. Thus, a portion of a light flux is not shielded by a member which supports a touch panel. Further, generation of a gap between the light flux output from the light sources and the touch panel surface can be prevented without minutely adjusting the optical system.

Further, the light sources output light fluxes toward the center of the touch panel. Therefore, the light can be efficiently delivered onto the whole surface of the touch panel. Accordingly, the whole surface of the touch panel can be used as a field for inputting the coordinates.

Further, the light sources are held at specified positions and output light fluxes toward the center of the touch panel. Thus, the light sources can be installed at a required position under stable conditions, and once adjusted, the light source section can be fixed in the stable state.

Further, the angle of incidence of the light flux output from the light sources onto the touch panel is less than the angle at which total reflection from the touch panel will take place. Therefore, the light flux falling on the touch panel can accurately be reflected, and a reflected light can be generated efficiently.

Further, the light sources are located such positions that the angle of incidence of the light flux output from the light sources onto the touch panel is less than the angle at which total reflection from the touch panel will take place. Thus, the light source section can be fixed in the stable state in which the light flux falling on the touch panel can accurately be reflected, and a reflected light can be generated efficiently.

Further, the light sources are two in number and each light source is positioned at a different portion on the flat surface. Because only the minimum required number of light sources are provided, a low cost coordinates inputting apparatus can be realized.

Further, one of the light source and one of said light-receiving section are integrated into one optical unit, and all of the light sources are arranged substantially in one plane and, each of the light source outputs a light flux spreading in a fan form from with the position at which the light source is located as the center. Accordingly, precision in assembly of light sources and the light-receiving sections with respect to the touch panel can be improved, and once adjusted, relative positions of the light sources and light-receiving sections are not displaced even when an external force is loaded to the optical system.

Other objects and features of this invention will become apparent from the following description with reference to the accompanying drawings.

DESCRIPTION OF THE PREFERRED EMBODIMENTS

An embodiment of the present invention is described in detail below.

Figure 1:
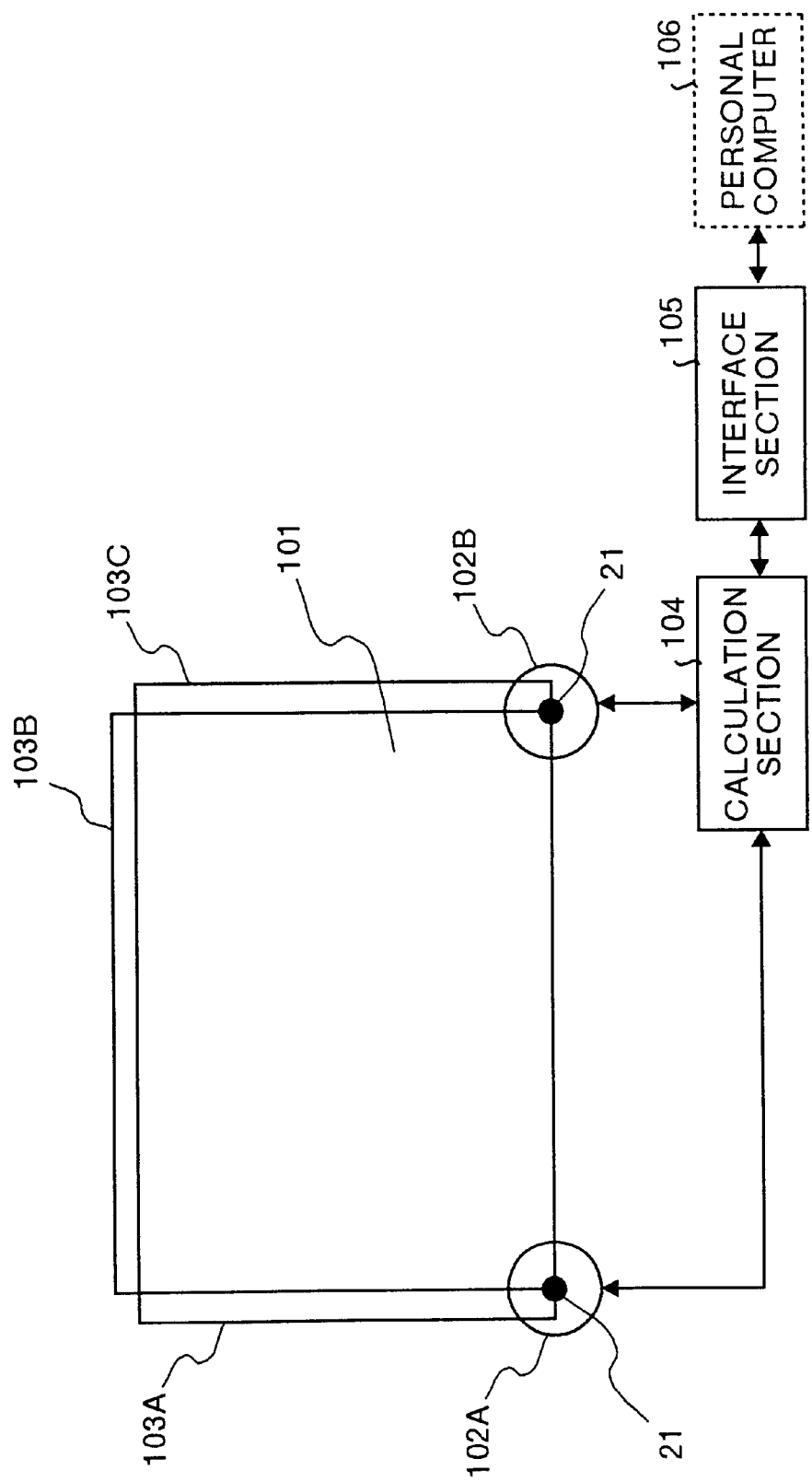
FIG. 1 is a block diagram of a coordinates inputting apparatus according to one embodiment of the present invention.

FIG. 1 is a block diagram showing the entire coordinates inputting apparatus according to the present invention. The coordinates inputting apparatus comprises a touch panel 101 used by an operator to input coordinates, and two light sources 21 which output light from different positions in the direction of the touch panel 101. The apparatus further comprises reflection members 103A, 103B, 103C which recursively reflect the light output by the light sources 21, and a CCD (Charge Coupled Device) 32 (see FIG. 2 and FIG. 3) which receives the light reflected by the reflection members 103A, 103B, and 103C. The apparatus also has a calculation section 104 which calculates the coordinates of the position based on the data concerning light reception. An interface section 105 transacts data between this calculation section 104 and a personal computer 106. The personal computer 106 finally receives the calculated coordinates.

Of the components explained above, the light source 21 and the CCD 32 at each corner are formed as an integrated optical unit 102A or 102B. The light source 21 has a thickness of about 3 mm substantially parallel to a plane, and it outputs a light flux spreading in the form of a fan having the center at a position where the light source is located. Each of the reflection members 103A, 103B, 103C has a structure in which trihedral cubes are arranged inside a sheet at a high density, and can reflect the light flux which falls on it at any incidence angle. In this embodiment, in all two optical units, that is the optical units 102A and 102B are provided at lower corners of the touch panel 101, and three reflection members 103A, 103B, and 103C are provided on three sides of the touch panel 101.

In the coordinates inputting apparatus according to this embodiment, when a shielding object such as a finger or a pen is placed on the touch panel 101 to input the coordinates of that position, only the light flux having an optical axis passing through the shielding object among those output from the light sources 21 can not reach the reflection members 103A, 103B, 103C. Because the light flux is cut (or shielded), only the elements of the CCD 32 present at a position where the light flux having the optical axis that should have originally been received the light flux do not receive the reflected light. The calculation section 104 identifies the optical axis of the light flux that has been cut by the shielding object from the position of the elements which do not receive the light flux.

Further, two optical units 102A, 102B have been provided. Therefore, one optical axis each can be obtained from the data in each optical units 102A, 102B, and the position where the shielding object touches the touch panel can be obtained as an intersection of these two optical axis. The calculation section 104 calculates the coordinates of the position where the shielding object touches the touch panel and the calculated coordinates are input into the personal computer 106 through the interface section 105.

The optical units 102A, 102B will be explained in detail below. Both the optical units 102A, 102B have the same configuration. Therefore, to avoid simple repetition of explanation, explanation about only the optical unit 102A will be given.

Figure 2:
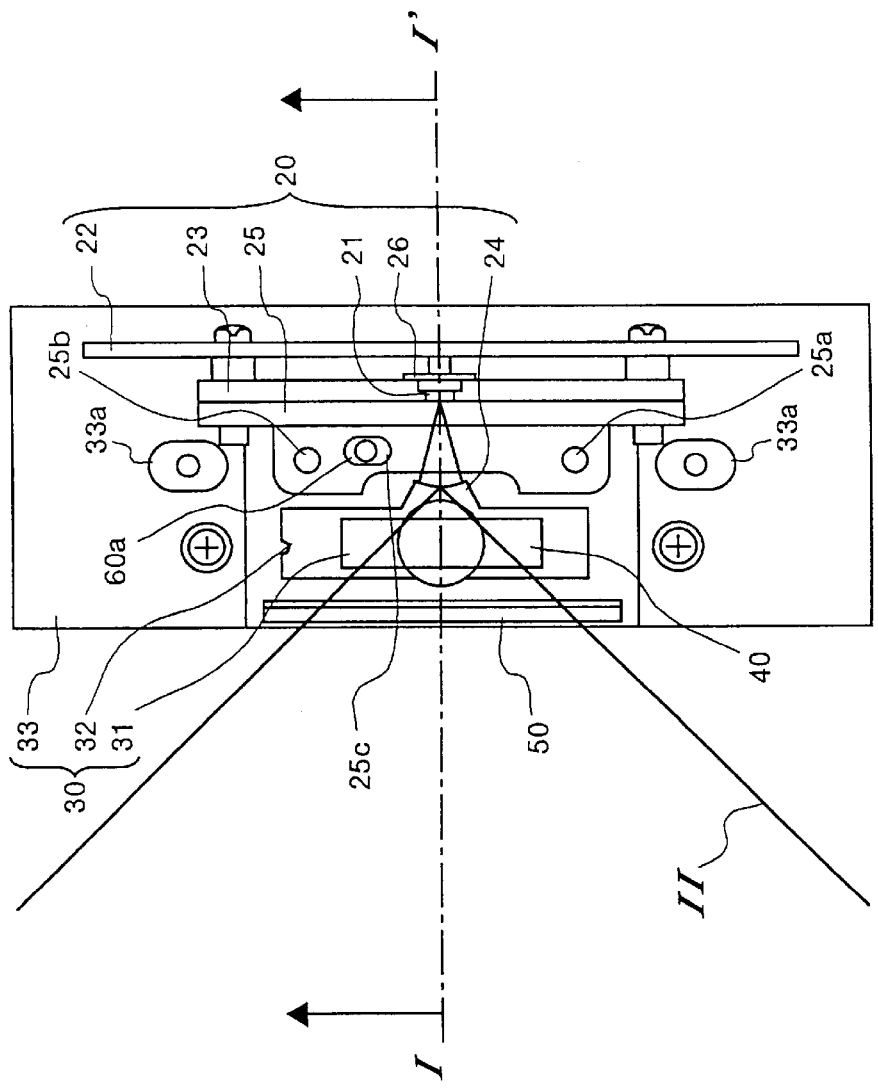
FIG. 2 shows a top surface of the optical unit shown in FIG. 1 (assuming that a face opposite to the touch panel is a bottom surface)
Figure 3:
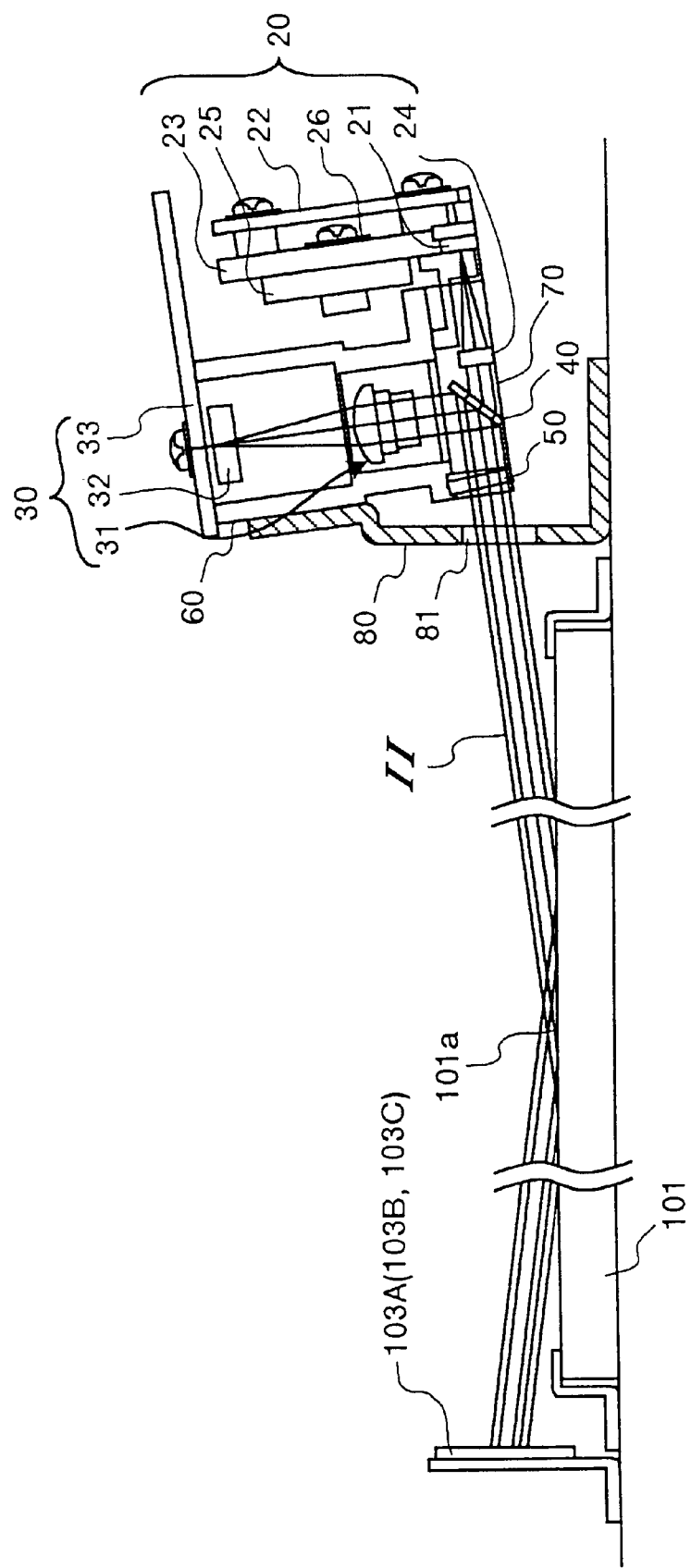
FIG. 3 shows a longitudinal cross section of the optical unit taken along the line I—I' in FIG. 2.

FIG. 2 shows a top surface of the optical unit 102A (assuming that a surface opposite to the touch panel 101 is a bottom surface). FIG. 3 is a longitudinal cross-sectional view taken along the line I—I' in FIG. 2. As shown in this figure, the optical unit 102A comprises a frame 60, a light-emitting section 20 and a light-receiving section 30 each located inside a member comprising a bottom plate 70, a half mirror 40 which separates the light flux output by the light-emitting section 20 from the reflected light flux entering into the light-receiving section 30, and a protection member 50 which protects the opening in the optical unit 102A from where the light is output or received. As shown in FIG. 3, this optical unit 102A is held by a bracket 80 at a specified angle against the surface 101a of the touch panel 101. Provided on this bracket 80 is a notched section for passing a light flux therethrough.

The light-emitting section 20 comprises the light source 21. The light source 21 is a laser diode (LD) which emits a visual light beam having a wavelength of 645 nm. The light-emitting section 20 further comprises a circuit board 22 which drives and controls the light source 21, a second holding plate 23 which holds the light source 21 and circuit board 22, a plate spring 26 for fixing the light source 21 to the second holding plate 23, a first holding plate 25 which holds the second holding plate 23, and a diffusion lens 24 which diffuses a laser beam output from the light source 21 in a direction parallel to the surface 101a of the touch panel 101 to obtain a fan shaped light flux with a central angle of about 90 degrees. The position, line linearity, width, and illuminance distribution of the light source 21 are decided based on such factors as how it is held by the second holding plate, and how the second holding plate 23 is held by the first holding plate 25.

The light-receiving section comprises the CCD 23 which receives a reflected light flux and converts the reflected light flux to electric signal. The light-receiving section also comprises a read lens which focuses the reflected light onto the CCD 32, and a circuit board 33 which drives and controls the CCD 32.

The protection member 50, which is made from a transparent glass, is provided on a front face of each of the optical units 102A, 102B (on a face from which a light flux is output). This protection member 50 is provided at an inclined posture in such a manner that it is perpendicular to the optical axis of the light flux output by the light source 21. In this embodiment, this inclination is set so that the protection member 50 is inclined by 6 degrees frontward. This angle of 6 degrees is the angle at which the light flux output by the light source 21 is reflected on the surface of the protection member 50 and no light flux falls directly on the CCD 32.

The frame 60 and bottom plate 70 are protection members for preventing external disturbance by completely separating a light flux to the CCD 32 or half mirror 40 from the external environment, or for preventing deposition of dust on the optical unit 102A or improving the mechanical strength of the optical unit 102A. In this embodiment, the light-emitting section 20 and light-receiving section 30 are assembled on the frame 60 and bottom plate 70 to form the optical units 102A and 102B as integrated units. Due to such an arrangement, precision in assembly of the light-emitting section 20 and light-receiving section 30 onto the touch panel 101 is improved. In addition, once assembled, the positions of the light-emitting section 20 and light-receiving section 30 are never displaced because of an external shock or the like. Thus, it is possible to improve the precision in detection of the coordinates with the coordinates inputting apparatus of this embodiment and to preserve the high precision in detection thereby.

In the configuration described above, the light-emitting section 20 and light-receiving section 30 are located on the same optical axis, and a light-emitting position of the light-emitting section 20 and a principal point of the read lens 31 are aligned on the same optical axis. Both the light flux output from the light-emitting section 20 and the reflected light flux received by the light-receiving section 30 go on this optical axis, and are separated from each other by the half mirror described above along the respective travel directions. That is, the light flux output from the light source 21 is converted by the diffusion lens 24 to that diffused in the horizontal direction and also in parallel to the touch panel surface 101a, travels along the touch panel surface 101a, and is recursively reflected by the reflection members 103A, 103B, and 103C. The reflected light flux travels on the same optical axis to the half mirror 40 and is reflected by the half mirror 40, and then travels toward the read lens 31 and is received by the CCD 32.

As the optical unit 102A is held by a bracket 80 at an angle against the surface 101a of the touch panel 101, the light flux output from the optical unit 102A is introduced at a pre-specified incidence angle to the touch panel surface 101a. Therefore, the light flux output from the optical unit 102A which travels along the surface 101a of the touch panel 101 is reflected by the surface 101a. After the output light flux is reflected at an arbitrary position on the surface 101a, the light flux is further recursively reflected by the reflection members 103A, 103B, 103C and it is once more reflected by the surface 101a. Finally, the light-receiving section 30 receives the light flux reflected from the surface 101a.

Positions on the surface 101a at which the optical units 102A and 102B output light fluxes may be set as desired. In this embodiment, however, it is assumed that the optical units 102A, 102B output light fluxes each having an optical axis (a central line of a fan-shaped form) directed toward the center of the surface 101a. Further, the angle of incidence of the light fluxes output from the optical units 102A, 102B onto the surface 101a is set to an angle which is less than the angle at which total reflection will occur (that is, when the angle of incidence is 90 degrees). This angle is set taking into consideration the angle at which the bracket 80 holds the optical units 102A, 102B.

Accordingly, with the coordinates inputting apparatus of this embodiment, diffused light fluxes output from the optical units 102A, 102B are not cut or shielded due to the thickness of the member that holds the touch panel 101. Furthermore, the gap between the diffused light fluxes and the touch panel surface 101a can be eliminated without the need to precisely adjust the optical system. As a consequence, detection error in the depth direction of the touch panel 101 can be prevented and precision in detection of the coordinates can be greatly improved.

A method of adjusting the light-emitting section 20 and light-receiving section 30 is explained below by taking the optical unit 102A as an example.

Long holes, which are not shown in the figure, are provided on the second holding plate 23, and with an adjustment knob (an eccentric pin) not shown which engages in the lengthy holes, the second holding plate 23 can be adjusted in the X and Y-axial directions. A long hole, which is larger than the long holes on the second holding plate 23, is provided on the circuit board 22 at a position opposite to the long holes on the second holding plate 23. This long hole on the circuit board 22 functions as an escape hole in adjustment.

Two screw holes 25a, 25b, one hole at each end, are provided on the ends of the first holding plate 25. Of these two screw holes 25a, 25b, the screw hole 25a has a diameter which is the same as a diameter of a screw used for tightening. On the other hand, the diameter of the screw hole 25b is larger than that of the screw. A long screw hole 25c is also provided. Further, and a screw hole 60a for insertion of an eccentric pin for adjustment of the first holding plate is provided at a position opposite to the screw hole 25c in the frame 60. By inserting the not shown eccentric pin into the screw holes 25c and 60a and rotating the pin it is possible to displace the first holding plate 25 towards or away from the diffusion lens 24.

The light source 21 is pressed by a spring 26 for fixing a light source and fixed to the second holding plate 23. Thus, the light source 21 always insures high precision in positioning, high efficiency in heat emission, and stable optical performance.

Adjustment of the light-receiving section 30 is performed as described below. That is, long holes 33a are provided at two places on the circuit board 33, so that the circuit board 33 can be adjusted in the vertical and horizontal (X and Y-axial) directions by a not shown adjustment knob (eccentric pin) against the first holding plate 25. The CCD 32 fixed on the circuit board 33 is adjusted together with the circuit board. This adjustment is performed in such a manner that a fan-formed diffused light-flux is received by the CCD 32 in parallel.

After adjustment is performed as described below, the circuit board 22, circuit board 33, first holding plate 25, and second holding plate 23 are jointed and fixed with joint members not shown in these figure at the respective positions. It is assumed that the components in this embodiment other than those described above are fixed. For instance, the bottom plate 70 and read lens 31 are jointed with not shown joint members or an adhesive.

Operation of the coordinates inputting apparatus will be explained below.

A light beam output from the light source 21 is diffused by the diffusion lens 24 to a fan-formed and flat light flux. This light flux (indicated by the legend II in FIG. 2 and FIG. 3) is divided into two light fluxes, one bound for the bottom plate 70, and the other irradiated as it is to the protection member 50. As the protection member 50 is inclined by 6 degrees, a major portion of the light flux irradiated onto the protection member 50 passes through the glassy surface of the protection member 50 and only a portion of it is reflected. This reflected light is further reflected by the half mirror 40, passes through the read lens 31, and is focused on the light-receiving elements of the CCD 32. On the other hand, the light flux having passed through the protection member 50 is irradiated onto the surface 101a of the touch panel 10 and is totally reflected from this surface 101a.

The light flux reflected from the surface 101a is irradiated onto the reflection members 103A, 103B, and 103C. The light flux is totally reflected by the reflection members 103A, 103B, 103C, and is again irradiated onto and totally reflected by the surface 101a. The reflected light flux travels to the optical units 102A, 102B, passes through the glass sheet of the protection member 50, and is separated by the half mirror 40 to a potion bound for the light-emitting section 20 and a portion bound to the light-receiving section 30. The light flux bound for the light-receiving section 30 is focused via the read lens 31 onto the CCD 32, where the light flux is converted to an electric signal.

When an operator touches the surface 101a, for instance, with a finger, the finger cuts the light flux, and the light flux does not reach the reflection members 103A, 103B, 103C. Therefore, only the elements which are originally to receive the shielded portion of the light flux generate an electric signal indicating that the light flux is not received. Optical axis of the light flux can be identified from positions of the elements.

The optical units 102A, 102B are set so that a light axis of an output light flux and a straight line connecting the light sources 21 provided in the optical units 102A,. 102B form an angle of, for instance, 45 degrees. The optical units 102A and 102B are provided at a distance from each other in the horizontal direction in the lower section of the touch panel 101, and further the distance is known, so that the coordinates of the position of the shielding object (a crossing point of the optical axes identified by the optical units 102A and 102B respectively) can be detected based on a principle of triangulation.

With the present invention, generation of a gap between the light flux and the touch panel surface can be prevented. Consequently, an error in detection in the depth direction because of such a gap can be prevented. Thus, it is possible to provide a coordinates Inputting apparatus and method which insures higher precision in detection of the coordinates.

Further, the entire surface of the touch panel can be used as a surface for inputting the coordinates. This insures higher operability of the coordinates inputting apparatus.

Further, once the light source(s) is adjusted, it is fixed and does not move accidentally. Therefore, the optical system can be adjusted relatively easily. In addition, reliability of the coordinates inputting apparatus can be further improved.

Further, light flux output onto the surface of the touch panel can be accurately reflected, and a reflected light flux can efficiently be generated. This insures higher reliability of the coordinates inputting apparatus.

Further, the light source(s) can be fixed in the stable state at a position where a reflected light flux can accurately and efficiently be generated. This insures higher reliability of the coordinates inputting apparatus.

Further, a minimum number of light sources can only be provided. Thus, a low cost coordinates inputting apparatus can realized.

Further, precision in assembly of the light source section and light-receiving section onto the touch panel can be improved and the improved precision can be preserved. In addition, because the optical system can easily be adjusted, reliability of the coordinates inputting apparatus can further be improved.

The present document incorporates by reference the entire contents of Japanese priority document, JP 11-186559, filed in Japan on Jun. 30, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinates inputting apparatus comprising:
    a substantially flat surface;
    a plurality of light sources positioned at specified angles to said flat surface by a bracket, wherein each of said plurality of light sources output a light flux that travels along said flat surface;
    at least one reflective section that recursively reflects the light fluxes output from said plurality of light sources; and
    a plurality of light-receiving sections that receive the light flux reflected by said reflective section, which plurality of light-receiving sections detect whether the output light flux is shielded;
    a bracket holding said plurality of light sources; and
    wherein said plurality of light sources output respective light fluxes onto a specific position on said flat surface and said plurality of light-receiving sections receive the light fluxes which are output from said plurality of light sources, reflected from said flat surface, recursively reflected by said reflective section, and once more reflected by said flat surface.

2. The coordinates inputting apparatus according to claim 1, wherein said plurality of light sources output light fluxes toward a center of said flat surface.

3. The coordinates inputting apparatus according to claim 1, wherein said plurality of light sources are held at specified positions and output light fluxes toward a center of said flat surface.

4. The coordinates inputting apparatus according to claim 1, wherein an angle of incidence of said light flux output from said plurality of light sources onto said flat surface is less than an angle at which total reflection from said flat surface takes place.

5. The coordinates inputting apparatus according to claim 1, wherein said plurality of light sources are located at positions where an angle of incidence of said light flux output from said light sources onto the flat surface is less than an angle at which total reflection from said flat surface takes place.

6. The coordinates inputting apparatus according to claim 1, wherein said light sources are two in number and each light source is positioned at a different portion on said flat surface.

7. The coordinates inputting apparatus according to claim 1, wherein one of said plurality of light sources and one of said plurality of light-receiving sections are integrated into one optical unit, and
    all of said plurality of light sources are arranged substantially in one plane and each of said plurality of light sources output a light flux spreading in a fan formation from a position at which each respective light source is located as a center.

8. A coordinate value input method for detecting input coordinates by sensing that a light flux is shielded, comprising the steps of:
    outputting light fluxes from at least two different positions to a desired position on a flat surface;
    recursively reflecting said light flux reflected by said flat surface; and
    receiving first said light flux reflection and then said recursive reflection from said flat surface.

* * * * *